March 2, 1971 R. V. WOOD 3,567,561
DIFFRACTION TYPE MOSAIC SYSTEM
Filed Jan. 9, 1969 2 Sheets-Sheet 1

INVENTOR
Remsen V. Wood
BY Walter G. Finch
ATTORNEY

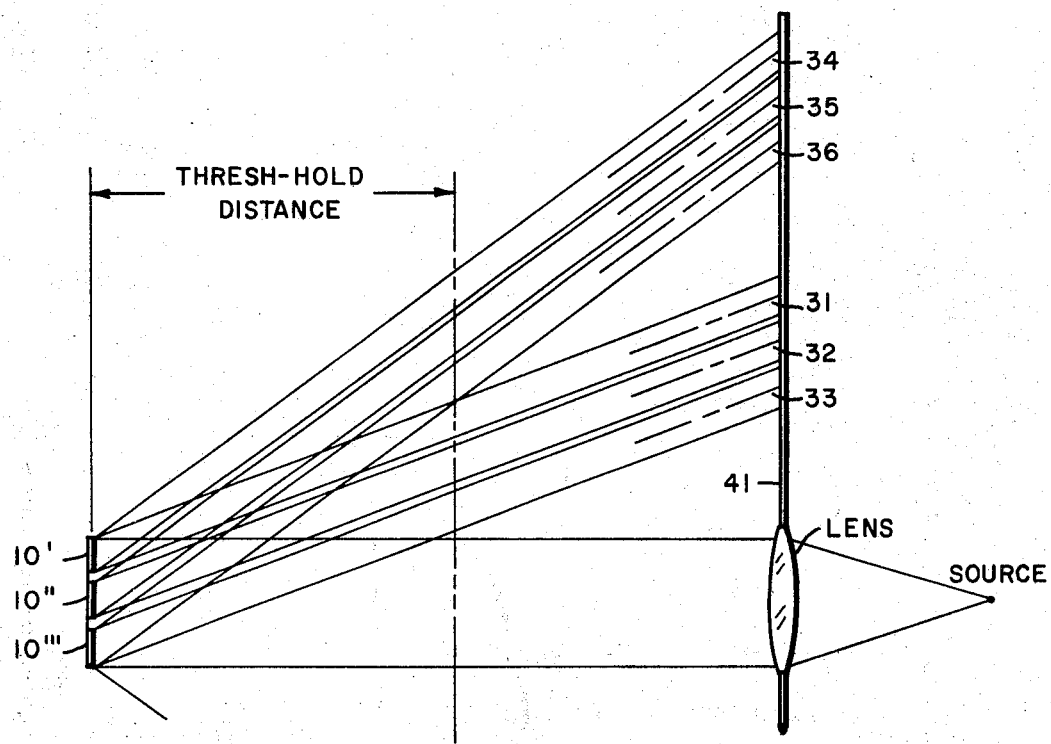
Fig. 7
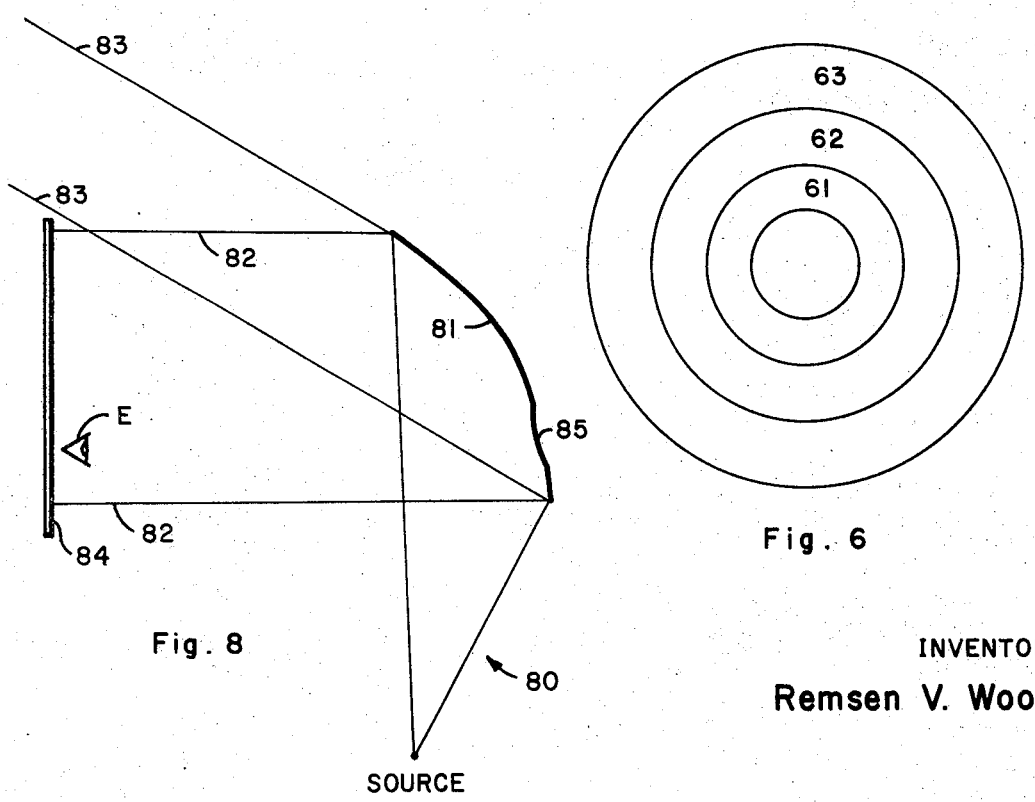
Fig. 8
Fig. 6
INVENTOR.
Remsen V. Wood

United States Patent Office 3,567,561
Patented Mar. 2, 1971

3,567,561
DIFFRACTION TYPE MOSAIC SYSTEM
Remsen V. Wood, Riderwood, Md. 21139
Continuation-in-part of application Ser. No. 467,312,
June 28, 1965. This application Jan. 9, 1969, Ser.
No. 797,324
Int. Cl. B44f 1/02
U.S. Cl. 161—34                                  7 Claims

ABSTRACT OF THE DISCLOSURE

Means and method for producing co-ordinate spectra from randomly arrayed mosaics of diffraction gratings by using curved-line gratings, and for increasing the efficiency of spectrum production by circular gratings by using arrays of parts of the gratings in selected structural organization.

---

This application is a continuation-in-part of my application Ser. No. 467,312, now abandoned, filed June 28, 1965, for Diffraction Type Mosaic System. Reference is also to be noted to my co-pending applications Ser. No. 606,988 filed Jan. 3, 1967, for Inlay Diffraction Gratings now U.S. Pat. No. 3,515,459; Ser. No. 615,421 filed Feb. 13, 1967, for Self Adhesive Diffraction Gratings now U.S. Pat. No. 3,516,730 and 629,586 filed Apr. 10, 1967, for Diffraction Grating Instrument Dials now U.S. Pat. No. 3,463,118.

This invention relates generally to surface ornamentation devices, and more particularly to improvements in systems for obtaining improved diffraction effects.

An object of this invention is to provide a diffraction type mosaic system which has a substantially flat reflective surface composed of a plurality of substantially spiral diffraction gratings, with said gratings being of any predetermined shape, as circular or polygonal. It is to be pointed out that in this invention a diffraction type mosaic system is illustrated using gratings having a triangular shape, but is not limited thereto, as a square, hexagonal, circular or equivalent shaped grating would function just as well in the system to give the overall ornamental effect desired, if the triangular shapes are randomly oriented.

If triangular shapes, or other shapes taken radially of a circular grating are properly oriented, the area distribution of spectral intensity as directly viewed at the grating mosaic, or the spectrum as projected on a screen, is made more uniform according to provisions of this invention; as will be seen this is a further object of the invention.

And a further object of this invention is to provide means for projecting a coordinate spectrum of circular shape from a plurality of gratings in random array in a plane;

Still a further object of this invention is to provide a device comprising a predetermined pattern of gratings arrayed in a plane and adapted for projecting a coordinate spectrum of circular shape.

And still a further object of this invention is to provide a device comprising a plurality of gratings arrayed on a curved surface for presenting particular illuminated surface appearances and spectrum projections over greater distances.

And yet a further object of this invention is to provide a unique means of determining local deviation from surface curvature in an optical system, using an illuminated mosaic of diffraction gratings to provide color indication of local departure from curvature.

Still another object of this invention is to provide a diffraction type mosaic system utilizing spiral gratings of circular, semi-circular, or polygonal shape to give an overall ornamental effect desired.

Still even another object of this invention is to provide a diffraction type mosaic system which can be used very effectively and economically in connection with signs and billboards for advertisements and equivalent illustrations.

A circular (spiral) grating replica can be cut into six equilateral triangles. Each triangle has one point which coincides with the center of the circle and is called the centerpoint.

Placing this triangle on an XY plane with its center point at X–O, Y–O and viewing the triangle along the Z axis it will be seen that the triangle diffracts color only if illuminated from the spherical sector which contains the triangle and the Z axis and also from the opposite spherical section. The diffraction color depends on the position of the light of the Z axis according to the law of diffraction:

$$L = S/N \; (\sin i = \sin d)$$

where:

L=wave length
N=order of spectra
$i$=angle of incident light
$d$=angle of diffraction
S=spacing of lines Although many shapes can be used, an equilateral triangle has several advantages. It gives a 60° sector for illumination which is equivalent to a viewing sector of 60° and reasonable in practice, it nests perfectly with other equilaterial triangles, and fits into isometric grid systems to give illusions of depth.

With these basic principles in mind, it is a further object of this invention to provide an arrangement of sectors of any desired shape, such as polygonal, or equivalent geometrical shape, taken from circular diffraction gratings thus producing novel color effect surfaces from the combinations.

Another object of this invention is to provide a surface of combined sectors from circular diffraction gratings of the same or different spacings of ruling to produce predictable patterns in spectral colors therefrom.

Still another object of this invention is to provide an arrangement of at least two differently ruled circular grating sectors of any predetermined polygonal shape so that a uniform color character or design on a different uniform color background is obtained.

Another object of this invention is to provide a geometrical solid faced with a mosaic of differently oriented sectors of any predetermined polygonal shape of spiral diffraction gratings to obtain a novel color effect which changes when the solid is moved or when lighted or viewed from different angles.

Other objects and attendant advantages of this invention will become more readily apparent and understood from the accompanying specification and single sheet of drawings in which:

FIG. 6 is a diagram of a circular spectrum;

FIG. 7 is an optical diagram of diffraction gratings arranged to project spectra onto a screen.

FIG. 8 is a diagram of a curved surface embodiment of this invention.

Figure 1:
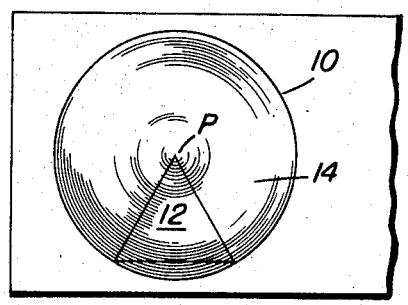
FIG. 1 is a view of a film formed with a circular diffraction grating replica showing how sectors are cut therefrom.

Referring now to the details of the drawings as shown in FIG. 1, reference numeral 10 indicates an embossed replica of a circularly or spirally ruled diffraction grating made on the aluminized side of cellulose acetate film. For further information the reader is referred to U.S. Pats. Nos. 484,934 and 551,769 both issued to John Jacobson on Jan. 26, 1892 and Dec. 24, 1895, respectively.

Figure 5:
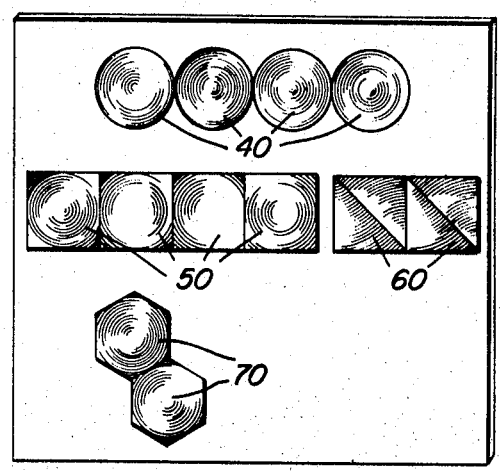
FIG. 5 is a front view illustrating sectors of various polygonal shapes, such as circular, square, triangular, or hexagonal.

For purposes of the present invention the replica 10 is cut into pieces, preferably pie shaped but not necessarily limited thereto, as the shape of the pieces can just as readily be circular 40, square 50, triangular 60, hexagonal 70, or similar shape, as indicated in FIG. 5, and is then trimmed so as to result in equilateral triangle sectors 12. While the circular or spiral ruling lines 14 are shown much enlarged in the drawings, on the replica 10 and sectors cut therefrom it should be clearly understood these are only visible with a microscope. It will be noted these lines 14 center P of the replica 10 and thus give a definite median of orientation to each sector which extends through the base and opposite vertex.

Figure 2:
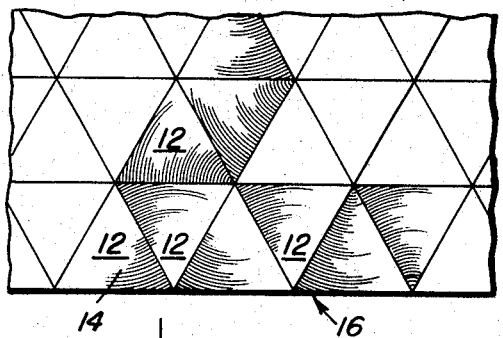
FIG. 2 is a front view of a surface comprising juxtaposed 60° sectors taken from circular gratings.

FIG. 2 shows how a surface 16 can be formed by attaching the sectors 12 in juxtaposition on a suitable backing web such as a sheet of paper. If the orientation of the lines 14 is random, one to the other of the sectors 12, a plurality of colors will be reflected from the surface 16 when it is illuminated by white light and viewed obliquely.

Those sectors 12 which are positioned as in the bottom row to have the same or parallel median line of orientation (in either direction) will reflect a predominance of one common color. Those sectors 12 which are positioned on a different but common line or parallel line of orientation will show a different predominant color. Thus as shown on the right side of the dotted line in FIG. 4 a character 18 can be formed so as to visibly stand out in color from its background color on a surface 20.

Figure 4:
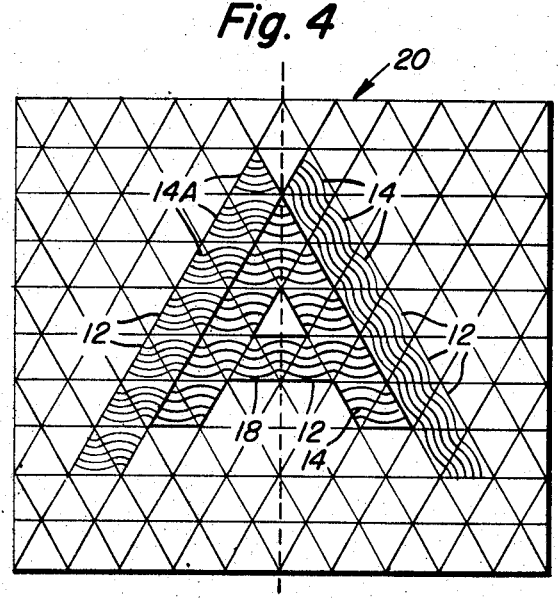
FIG. 4 is a front view illustrating an arrangement of sectors cut from circular diffraction gratings in which colored characters on contrasting colored background are produced by this invention.

On the left side of the same illustration in FIG. 4, the contrast is obtained by the same orientation for the character sectors as background sectors but using sectors cut from two replicas which have differently spaced rulings 14A, all sectors being oriented in a common or parallel line.

Figure 3:
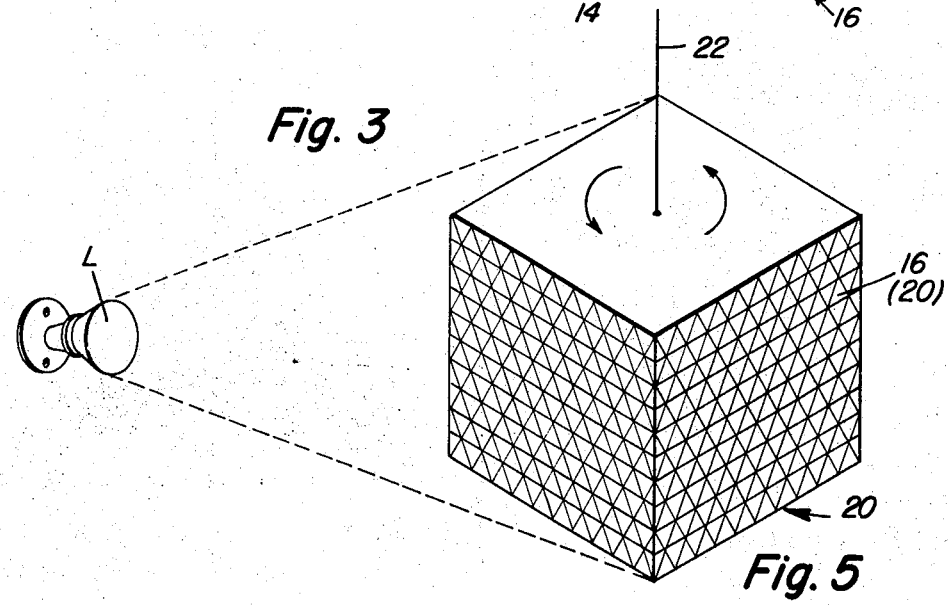
FIG. 3 is a perspective view depicting an ornamental article which is faced with a mosaic surface such as that of FIG. 2 and arranged to be rotated or swung while illuminated.

FIG. 3 depicts an ornamental article in the form of a cube 20. The cube 20 is faced with mosaic surfaces 16 or 20 and suspended from a filament 22. If the cube 20 so prepared is caused to rotate by a motor (not shown), attached to a filament 22 or allowed to swing in the wind while illuminated from a white lamp L a very beautiful color effect is obtained which continually changes. Other geometric solid forms may be used for example an equilateral prism, or two equilateral prisms base-to-base.

FIG. 6 is a diagram of a spectrum produced by on-axis illumination of a spiral or circular grating. Unlike the orders of straightline gratings, each of the orders 61, 62 and 63 is circular, and is concentric with the other orders.

If the illuminating beam is off-axis (i.e. if it makes an angle other than 90° with the center of the grating) the projected spectrum will be ellipsoidal in shape. The spectrum may be projected on a screen, as in FIG. 7, or viewed with the eye or other sensor. If a screen is used, and is tipped with respect to the grating, a similar ellipsoidal shape results.

A spectrum consisting of concentric orders like that of FIG. 6 gives a highly ornamental sunburst effect.

However, there is a limitation on the size of high quality single gratings which can be ruled with presently available ruling engines. Because of limiting line-spacing and groove-shape tolerances, single spiral gratings of greater than about 1.5" diameter are too expensive for general ornamental use. Dies made from gratings of one inch diameter and larger present difficulties increasing with size in mass production of plastic replica gratings.

Hence it has seemed prior to the present invention that the size of bright circular spectra having concentric orders was limited by the size of single spiral gratings presently available for ornamental use.

This is now changed. According to principles of the present invention, the size of individual spiral gratings is no longer a limitation on the size of circular spectra which can be produced.

Large unitary circular spectra like that shown in FIG. 6 can be produced using an array of circular rulings having similar characteristics such as line spacing and blaze angle. Gratings and pieces of gratings of various shapes and sizes can be used in the array without destroying the effect. For example, gratings as in FIG. 5 taken as a whole, would co-act to produce a unitary spectrum. Under suitable illumination such a matched array of circular gratings can be made to appear to be substantially of a spectral color, and at the same time can be arranged to project a unitary spectrum onto a screen. The effect is particularly striking if the rulings are of symmetrical groove-shape.

A principal proviso in producing a single spectrum from such an array of circular gratings is that the spectrum must be viewed at a distance greater than the particular threshold distance involved. The threshold distance is determined in part by the diffracting angles of the rulings, by the illuminating beam, and by the area of the array. The geometry is best examined in reference to a screen. Inside the threshold distance, the spectra projected on the screen will be mixed. Beyond the threshold distance, the spectra will merge into the characteristic discrete circular orders.

Explanation of the threshold distance requirement is shown in FIG. 7. Light from source S is made parallel by lens 71. (Parallel light is preferable, but not essential.) Gratings 10', 10" and 10"' are illuminated by the beam of parallel light.

According to well known optical principles, since the centerlines are parallel, diffracted beams 31–33 from the respective gratings will produce the same part of a spectrum, or color, on screen 41. Similarly, the beams 34–36, diffracted at a different angle, but having parallel centerlines, will all produce the same part of a spectrum, in this case another color. If the screen is, as shown, farther from the gratings than the point at which the extreme outer ray of beam 31 of the grating 10' crosses clear of the extreme outer ray of beam 36 of grating 10"', the spectra will not be mixed. This crossover point of the extreme maximum angle and minimum angle rays, determines the threshold distance beyond which the particular array of mosaic of gratings shown projects a coordinate, unmixed, circular spectrum. To be considered, of course, are only the orders which are bright enough to affect substantially the visual appearance.

It can be seen from the diagram that there is little limit, in theory, to the size circular spectrum which can be produced in this manner. Further, it can be seen that the individual gratings do not have to be placed in any particular order in the plane. Both orientation and spacing can be random, as previously noted. There is, unlike the case of straightline gratings, a necessary coincidence of orders in any direction since the beam centerlines for a chosen order are all parallel in any particular direction.

A further feature of this invention is that an illuminated grouping of portions of circular gratings, such as the radial sectors in FIG. 2, will also produce a circular spectrum like that of FIG. 6.

Restricting the arrangement to that shown in the lowest row of FIG. 2, in which the median radii of the respective elements are parallel, will reduce the brightness of area of the circular spectrum projected. This tends to produce opposed arcs of spectra rather than continuous circles. However the result is to brighten substantially the surface appearance of the mosaic so arranged, under optimum illumination and in selected viewing directions. This ensues from the following consideration: the surface appearance of off-axis illuminated circular gratings is characterized by bright, often monochromatic "propellers" or opposed radial sectors, the rest of the diffracting surface appearing relatively dark and of another color. The width of the blades of the "propellers" is determined by the angular width of the source of grating illumination.

Under most conditions of display-illumination or of ambient illumination, the width of the source is small— usually no more than 60°. The entire circular area of the grating is not efficiently used under these conditions. Cutting out and re-assembling only the "bright" opposed radial sectors, maintaining the original orientations with respect to the source of illumination, produces a mosaic in which the entire surface is efficiently used and bright in appearance. Re-orientation of some of the elements of such an otherwise uniformly bright mosaic, according to these principles of the invention, as in the right half of FIG. 4, can be used to produce brilliant contrasts in pattern, as directly viewed, not heretofore obtainable, while substantially preserving the projection of a coordinate circular spectrum.

FIG. 8 shows apparatus 80 demonstrating the use of mosaic surface curvature according to principles of this invention to extend practical viewing distance, projection distance, and spectrum dimension.

Curved surface mosaic 81 comprises a plurality of co-acting diffraction grating elements. These elements are preferably circular or spiral gratings juxtaposed (see for example, FIGS. 2–4) to provide most uniform response to illumination. The mosaic is formed to a desired optical contour by heat-sagging the plastic base onto a mold, by fabrication directly on a piece having the desired contour, or by other suitable means.

The light source, which is preferably incandescent, is placed at a position with respect to the curved mosaic which will produce a beam of diffracted light 82—82 as required for the particular application. In the arrangement shown, the optical curvature chosen for the surface 81 is effectively parabolic. The spectrum is projected onto screen 84, which, as result of curvature of the mosaic, can be removed a greater distance from the mosaic than would otherwise be practical for bright projection. By the same token the distance from which the spectral colors of the mosaic can be viewed directly is substantially extended.

A local surface irregularity as at 85 will be indicated as an area of color different from the uniform color of the rest of the surface when viewed directly, as from E. This surface-testing feature of the invention has several novel aspects. For example, it requires no knife edge or other apparatus, and is color-sensitive to inclination of the surface in any direction. The method is useful in visually estimating a wide range of surface irregularities. A knowledge of the grating constant and of the geometry of the test arrangement will be found sufficient to assign meaningful values to the color indications.

Obviously many modifications and variations of the present invention are possible in light of the above teachings. It is, therefore, to be understood that within the scope of the appended claims the invention may be practiced otherwise than as specifically described.

What is claimed is:

1. A reflective diffraction grating device for projecting rays forming a coordinate spectrum of a source of light from a plurality of diffracting elements illuminated by a beam from said source, comprising: a plurality of circularly ruled diffraction grating elements, said elements having uniform spacing, depth, and angle of ruling, and being juxtaposed in mosaic array.

2. A device as recited in claim 1, all said grating elements being plane and all said grating planes being coplanar.

3. A device as recited in claim 2, the said spectrum comprising plural concentric spectral orders, and additionally a second plurality of circularly ruled diffraction grating elements, of different spacing from the first said plurality of circularly ruled diffraction grating elements, intermediately disposed between plural of the first said circularly ruled diffraction grating elements in said mosaic array.

4. A device as recited in claim 2, plural of said elements comprising respectively portions of circular gratings having circular rulings.

5. A device as recited in claim 4, each said circular ruling having a median radius, the median radius of one said ruling being disposed at an angle to the median radius of another said ruling.

6. A device as recited in claim 4, the said plurality of diffracting elements being arbitrarily oriented.

7. A device as recited in claim 2, said circularly ruled diffraction gratings being radial sectors of gratings contiguously fitted together, each said sector having a median radius and all said median radii being parallel, whereby the process of said projection in a selected direction is made more efficient.

References Cited
UNITED STATES PATENTS

| | | | |
|---|---|---|---|
| 551,769 | 12/1895 | Jacobson | 161—34 |
| 1,347,173 | 7/1920 | Mathes | 161—34X |
| 1,354,471 | 10/1920 | Doner | 161—34X |
| 1,996,539 | 4/1935 | Dufay | 161—34 |
| 2,875,543 | 3/1959 | Sylvester et al. | 161—34 |
| 2,958,148 | 11/1960 | Sylvester et al. | 161—34 |

J. STEINBERG, Primary Examiner

U.S. Cl. X.R.

350—162; 46—49